(12) United States Patent
Kurzeja

(10) Patent No.: US 7,361,093 B2
(45) Date of Patent: Apr. 22, 2008

(54) UNIVERSAL JOINT WITH CUP RETAINER

(75) Inventor: Patrick L. Kurzeja, White Lake, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 276 days.

(21) Appl. No.: 11/125,965

(22) Filed: May 10, 2005

(65) Prior Publication Data

US 2006/0258467 A1    Nov. 16, 2006

(51) Int. Cl.
*F16D 3/40* (2006.01)
(52) U.S. Cl. .................... 464/131; 277/551; 277/562
(58) Field of Classification Search ............... 277/549, 277/551, 562, 572; 464/131, 133
See application file for complete search history.

(56) References Cited

U.S. PATENT DOCUMENTS

| | | |
|---|---|---|
| 4,806,026 A | 2/1989 | Bauer et al. |
| 4,834,691 A * | 5/1989 | Schultze et al. ............ 464/131 |
| 6,050,571 A * | 4/2000 | Rieder et al. ................ 277/353 |
| 6,077,166 A | 6/2000 | Reynolds et al. |
| 6,183,369 B1 * | 2/2001 | Faulbecker et al. ......... 464/131 |
| 6,357,754 B1 * | 3/2002 | Rieder et al. ............ 277/549 X |

FOREIGN PATENT DOCUMENTS

| | | | |
|---|---|---|---|
| DE | 31 18 430 A1 * | 11/1982 | ................. 464/131 |
| EP | 0 564 875 A1 * | 10/1993 | ................. 464/133 |
| EP | 1 225 355 | 7/2002 | |
| GB | 1 211 753 | 11/1970 | |
| GB | 2 082 287 | 3/1982 | |

OTHER PUBLICATIONS

International Search Report, Jun. 1, 2006.

* cited by examiner

*Primary Examiner*—Greg Binda
(74) *Attorney, Agent, or Firm*—Carlson, Gaskey & Olds

(57) ABSTRACT

A universal joint includes a seal assembly that is positioned between each trunnion and a corresponding cup. The seal assembly includes a resilient seal that engages an inner surface of the cup and an outer surface of the trunnion. A deflector provides a snap fit for attaching the cup to the trunnion. The deflector is formed form a rigid and deformable material that protects the resilient seal from contamination, in addition to retaining the cup to the trunnion.

20 Claims, 2 Drawing Sheets

UNIVERSAL JOINT WITH CUP RETAINER

TECHNICAL FIELD

The subject invention relates to a seal assembly positioned between a universal joint trunnion and an associated cup that utilizes a rigid and deformable deflector to protect the seal assembly from contamination, and to retain the cup to the universal joint trunnion.

BACKGROUND OF THE INVENTION

Vehicle drivelines include at least one driveshaft that is used to transmit power from a vehicle engine and transmission to a single drive axle or tandem drive axle. Typically, heavy-duty vehicles, such as large trucks, include more than one driveshaft as a result of having a long wheelbase, and/or use of a tandem drive axle. At each end of a driveshaft, universal joints (U-joints) are used to connect the driveshaft to the next driveline component. For example, U-joints can be used to connect one driveshaft to another driveshaft or can be used to connect a driveshaft to a drive axle component.

The U-joint allows two driveline components to be oriented at different angles relative to each other to accommodate relative movement and angular misalignment while transmitting torque between the two driveline components. Further, as drive axles cooperate with a vehicle suspension to dampen shocks from rough road conditions, U-joints provide flexibility to allow the adjoining driveline components to move relative to one another Typically, each U-joint includes a center body member with four (4) trunnions that extend outwardly from the center body member to form a shape of a cross. The U-joints also include two yokes that each have two bore locations at diametrically opposed positions. The yokes are each mounted to two of the trunnions. The combination allows the two yokes to move angularly relative to each other with respect to the center of the cross member. A cup and bearing assembly is mounted on an end of each trunnion. The cups are coupled to the yokes.

In order for the U-joint to operate properly over long periods of time, it is important to have good lubrication. The center body member typically includes an external grease fitting that is in fluid communication with each trunnion via internal grease grooves or channels. The cup and bearing assembly receives lubrication through the grease grooves. The cup and bearing assembly includes a seal assembly that seals the grease within the center body member.

There are several disadvantages with current seal assemblies. One disadvantage is that current seal assemblies do not always provide sufficient protection from external contaminants. External contaminants that enter the cup and bearing assembly can damage bearing components resulting in premature wear of the U-joint. Another disadvantage is that seal longevity directly depends on regular replacement of lubrication, which is time consuming and difficult to provide as frequently scheduled service and maintenance operations cause vehicle downtime.

Another disadvantage with current cup and bearing assemblies relates to assembly and handling of cups to the trunnions. Once the cups are assembled onto the trunnions, a wire is required to hold the cups in place until the center body member can be assembled onto the yokes. This requires additional assembly time and material.

Thus, there is a need for a universal joint assembly that does not require a separate retaining wire, and which includes improved sealing characteristics, in addition to overcoming other above-mentioned deficiencies in the prior art.

SUMMARY OF THE INVENTION

A universal joint assembly includes a center cross member having a plurality of radially extending trunnions. Each trunnion includes a cup that is supported on a bearing assembly. A seal assembly provides a sealing interface between each cup and trunnion to protect the bearing assembly. The seal assembly includes a resilient seal member and a deflector that attaches and holds the cup to the trunnion. In addition to providing an attachment interface between the cup and trunnion, the deflector improves sealing characteristics by protectively enclosing the resilient seal member in a cavity formed between the trunnion and cup.

The deflector is formed from a rigid and deformable material, such as a thermoplastic polyester elastomer material, for example. The deflector preferably provides a snap-fit attachment interface to the cup and trunnion, which facilitates assembly. The deflector includes a first portion that is received within a groove formed on the cup and a second portion that is received within a recessed area formed on the trunnion.

By incorporating a deflector into the seal assembly, the subject invention provides improved sealing characteristics for a U-joint as well as eliminating the need for a retaining wire attachment for handling purposes. These and other features of the present invention can be best understood from the following specification and drawings, the following of which is a brief description.

DETAILED DESCRIPTION OF THE PREFERRED EMBODIMENT

Figure 1:
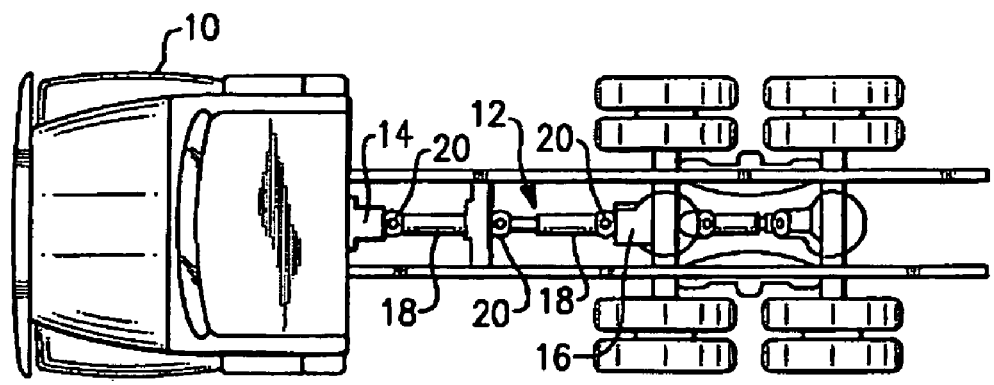
FIG. 1 is a schematic view of vehicle with a driveline incorporating the subject invention.

A vehicle 10 having a driveline 12 is shown in FIG. 1. The driveline 12 extends from a transmission component 14 to a drive axle 16. The drive axle 16 shown in FIG. 2 comprises a tandem drive axle, however, other drive axle configurations could also be used. The driveline 12 includes a plurality of shafts 18 that provide connecting links from the transmission component 14 to the drive axle 16.

At each end of each shaft 18, a universal joint (U-joint) 20 is used to connect one shaft 18 to the next shaft 18. The U-joint 20 allows two driveline components, such as adjoining shafts 18, to be oriented at different angles relative to each other to accommodate relative movement and angular misalignment while transmitting torque.

Figure 2:
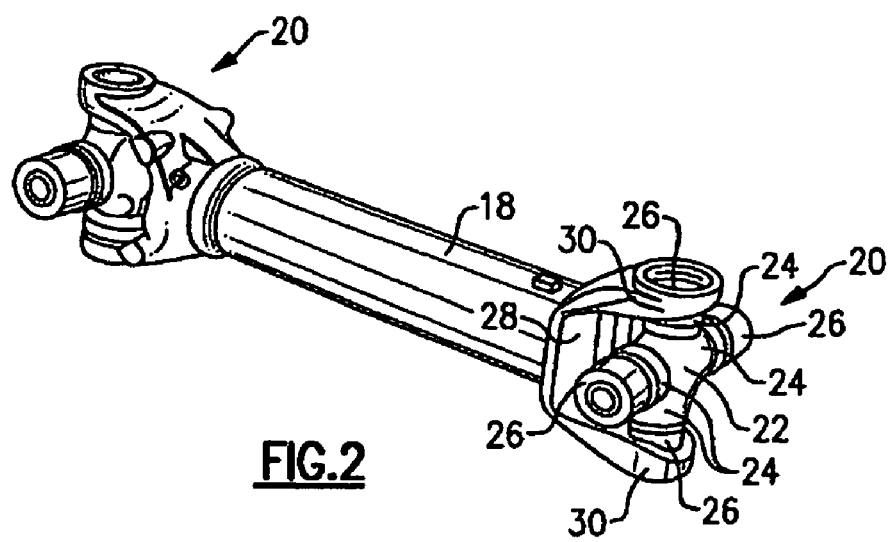
FIG. 2 is one example of a driveshaft and universal joint assembly incorporating the subject invention.

Each U-joint 20 includes a central body 22 with a plurality of trunnions 24 extending radially outwardly from the central body, as shown in FIG. 2. Preferably, the central body includes four (4) trunnions 24 that are orientated into a shape of a cross, as known. Each trunnion 24 includes a cup 26 that is received within a yoke 28. One yoke 28 is supported on each end of the shaft 18. The yoke 28 includes a pair of opposing arms 30 that are coupled to two (2) of the trunnions 24. A connecting yoke includes another pair of opposing arms that are coupled to the remaining two trunnions 24.

Figure 3:
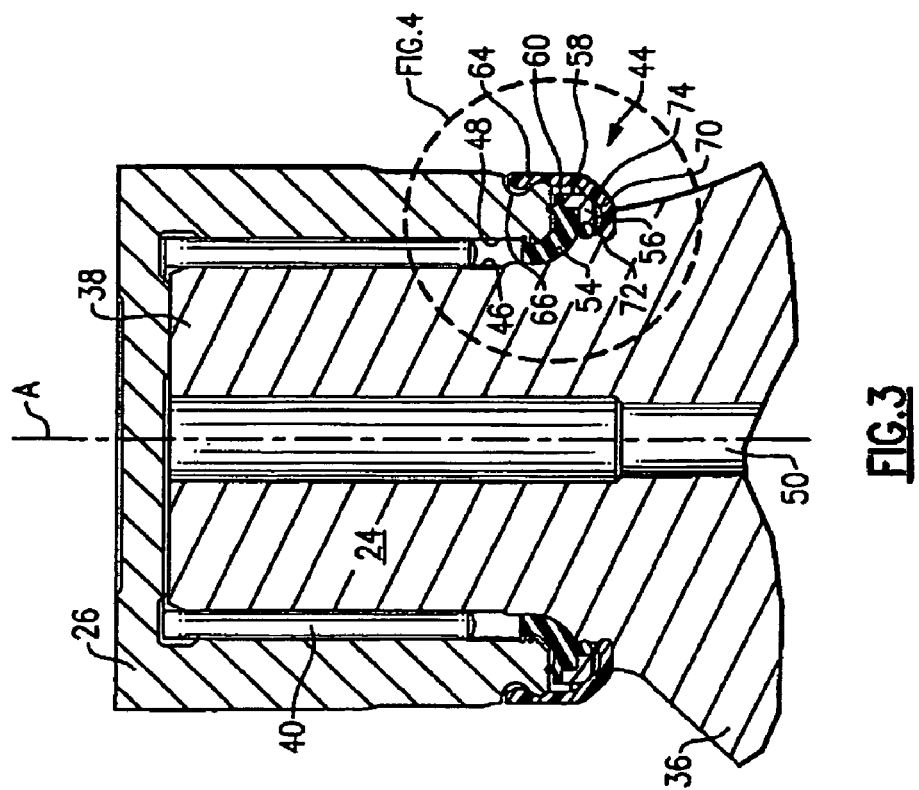
FIG. 3 is a cross-sectional view of one trunnion from a universal joint assembly incorporating the subject invention.

A cross-sectional view that is similar for each trunnion 24 is shown in FIG. 3. The trunnion 24 defines an axis A that extends along a length of the trunnion 24. The trunnion 24 extends along the axis A from a base end portion 36 at the central body 22 to a distal end portion 38. The cup 26 is received over the distal end portion 38. A needle bearing assembly 40 is positioned between the cup 26 and the trunnion 24.

A seal assembly 44 is positioned between an outer surface 46 of the trunnion 24 and an inner surface 48 of the cup 26. The seal assembly 44 seals lubricant within the U-joint for the needle bearing assembly 40. Lubricant is delivered to the needle bearing assembly 40 through a groove or channel 50 formed within the trunnion 24 as known.

Figure 4:
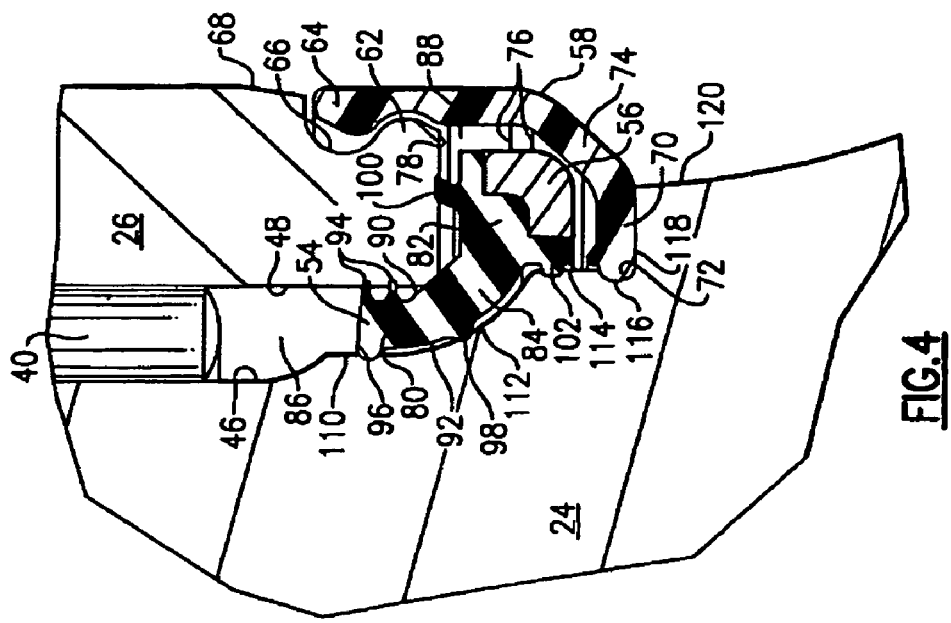
FIG. 4 is an enlarged cross-section view of an area identified in FIG. 3.

The seal assembly 44 includes a resilient seal member 54 with an insert molded portion 56 that is spaced from the cup 26 as shown in FIG. 3-4. A deflector 58 encloses the seal assembly 44 within a cavity 60 formed between the cup 26 and trunnion 24 with the insert molded portion 56 being positioned directly between the resilient seal member 54 and deflector 58 as shown in FIG. 4. In addition to providing a protective environment for the seal assembly 44, the deflector 58 secures the cup 26 to the trunnion 24. Preferably, the deflector 58 is secured to the trunnion 24 with a snap-fit attachment interface. The snap-fit attachment is capable of retaining the cup 26 on the trunnion 24 without requiring any other attachment hardware.

The snap-fit attachment is achieved by forming the deflector 58 from a rigid and deformable material. Preferably, the deflector 58 is formed from a thermoplastic polyester elastomer material, such as Hytrel®, for example. Any type of resilient sealing material can be used to form the resilient seal member 54.

The cup 26 includes a protruding portion 62 that operates with the deflector 58. The deflector 58 includes a first portion 64 that is received within a recess or groove 66 formed within an outer surface 68 of the cup 26, and a second portion 70 that engages a groove or recess 72 on the outer surface 46 of the trunnion 24. The protruding portion 62 of the cup 26 is received within a corresponding recess formed in the first portion 64 of the deflector 58. The first portion 64 extends in a first direction and the second portion 70 extends in a second direction that is transverse to the first direction. In the example shown, the first portion 64 is orientated generally perpendicular to the second portion 70, however, other angular relationships could also be utilized. The deflector 58 includes a center or third portion 74 that transitions from the first portion 64 to the second portion 70. The third portion 74 is orientated obliquely relative to the first 64 and second 70 portions. Third portion 74 can have a curved or linear profile. Fins 76 (FIG. 4) are optionally provided on the deflector 58 for reinforcing purposes.

As shown in FIG. 4, the resilient seal member 54 includes a first seal portion 80, a second seal portion 82, and a third seal portion 84 that transitions from the first seal portion 80 to the second seal portion 82. The first seal portion 80 extends generally parallel to the axis A of the trunnion 24, and into a first gap 86 formed between the inner surface 48 of the cup 26 and the outer surface 46 of the trunnion 24. The second seal portion 82 extends transverse to the axis A and into a second gap 88 formed between a distal edge surface 78 of the cup 26 and the outer surface 46 of the trunnion 24.

The third seal portion 84 is orientated obliquely relative to the first 80 and the second 82 seal portions.

The resilient seal member 54 is uniquely configured with multiple protruding portions to provide an effective sealing interface between the cup 26 and the trunnion 24. The resilient seal member 54 includes a first side 90 that faces the cup 26 and a second side 92 that faces the trunnion 24. In the example shown, a first protruding portion 94 extends from the first side 90 of the first seal portion 80 to directly engage the inner surface 48 of the cup 26. A second protruding portion 96 extends from the second side 92 of the first seal portion 80 to directly engage the outer surface 46 of the trunnion 24. A third protruding portion 98 extends from the second side 92 of the third seal portion 84 to directly engage the outer surface 48 of the trunnion 24. A fourth protruding portion 100 extends from the first side 90 of the second seal portion 82 to directly engage the distal edge surface 78 of the cup 26. A fifth protruding portion 102 extends from the second side 92 of the second seal portion 82 to directly engage the outer surface 46 of the trunnion 24.

The outer surface 46 of the trunnion 24 comprises a contoured surface with multiple stepped portions that cooperate with the resilient seal member 54 and deflector 58 to provide a secure and sealed environment. In the example shown, the contoured surface includes at least a first surface portion 110 extending generally parallel the axis A, a second surface portion 112 curving away from the first surface portion 110 outwardly in a direction away from the axis A, and a third surface portion 114 extending from the second surface portion 112 in a direction generally parallel to the axis A. The second protruding portion 96 directly engages the first surface portion 110, and the third protruding portion 98 directly engages the second surface portion 112. The fifth protruding portion 102 directly engages the third surface portion 114.

In the example shown, the contoured surface also includes fourth surface portion 116 curving inward from the third surface portion 114 in a direction toward the axis A, a fifth surface portion 118 extending from the fourth surface portion 116 in a direction transverse to the axis A, and a sixth surface portion 120 extending from the fifth surface portion 118 in a direction parallel to the axis A. The deflector 58 directly engages at least the fourth surface portion 116 and the fifth surface portion 118. The sixth surface portion 120 comprises a non-machined trunnion surface.

The unique configuration of the resilient seal member 54 with multiple protruding portions, in combination with the deflector 58, provides a protective environment for the needle bearing assembly 40 and other internal U-joint components. This unique configuration will allow for extended lubrication intervals that could be as high as 100,000 miles between greasings. Additionally, the deflector 58 has an integrated function of retaining the cup 26 on the trunnion 24 for handling purposes, which eliminates the need for a wire and a wire-retaining groove in the cup 26.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:
1. A universal joint comprising:
a central body having at least one trunnion;
a cup rotatably supported on said at least one trunnion; and a seal assembly providing a sealed interface between said at least one trunnion and said cup wherein said seal assembly includes;
a resilient seal including a first seal portion engaging an inner surface of said cup and an outer surface of said at least one trunnion and a second seat portion that transitions from said first seal portion and extends into a gap formed between a distal edge surface of said cup and said outer surface of said at least one trunnion,
an insert attached to said resilient seal and spaced apart from said cup, and
a deflector that provides an attachment interface between said cup and said at least one trunnion to substantially enclose said resilient seal within a cavity formed between said at least one trunnion and said cup, wherein said insert is positioned within a space between said second seal portion and said deflector.

2. The universal joint according to claim 1 wherein said attachment interface comprises a snap-fit attachment.

3. The universal joint according to claim 1 wherein said deflector comprises a rigid and deformable material.

4. The universal joint according to claim 3 wherein said rigid and deformable material comprises a thermoplastic polyester elastomer.

5. The universal joint according to claim 1 wherein said insert is positioned directly between an outer surface of said second seal portion and an inner surface of said deflector such that said insert does not contact said cup.

6. A universal joint comprising:
a central body having at least one trunnion;
a cup rotatably supported on said at least one trunnion; and
a seal assembly providing a sealed interface between said at least one trunnion and said cup wherein said seal assembly includes a resilient seal engaging an inner surface of said cup and an outer surface of said at least one trunnion, and a deflector that provides an attachment interface between said cup and said at least one trunnion to substantially enclose said resilient seal within a cavity formed between said at least one trunnion and said cup, and wherein said deflector includes a first portion received within a first groove formed within an outer surface of said cup and a second portion received within a second groove formed within said outer surface of said at least one trunnion such that said second portion is held fixed relative to said at least one trunnion to form said attachment interface.

7. The universal joint according to claim 6 wherein said first portion extends in a first direction and said second portion extends in a second direction that is generally perpendicular to said first direction.

8. The universal joint according to claim 6 wherein said cup includes a protruding portion adjacent said first groove, said protruding portion being received within a recess formed within an inner surface of said first portion of said deflector.

9. The universal joint according to claim 6 wherein said deflector includes a central portion interconnecting said first and said second portions, said central portion extending obliquely relative to said first and said second portions.

10. The universal joint according to claim 6 wherein said deflector includes a plurality of reinforcing fins extending inwardly from an inner surface of said deflector toward said resilient seal.

11. A universal joint comprising:
a central body having at least one trunnion that defines an axis extending along a length of said at least one trunnion;
a cup rotatably supported on said at least one trunnion; and
a seal assembly providing a sealed interface between said at least one trunnion and said cup wherein said seal assembly includes a resilient seal engaging an inner surface of said cup and an outer surface of said at least one trunnion, and a deflector that provides an attachment interface between said cup and said at least one trunnion to substantially enclose said resilient seal within a cavity formed between said at least one trunnion and said cup, said deflector comprising a rigid and deformable material, and wherein said resilient seal includes a first seal portion extending generally parallel to said axis and into a first gap formed between said inner surface of said cup and said outer surface of said at least one trunnion, a second seal portion extending transverse to said axis and into a second gap formed between a distal edge surface of said cup and said outer surface of said at least one trunnion, and a third seal portion transitioning from said first seal portion to said second seal portion wherein said third seal portion is orientated obliquely relative to said first and said second seal portions.

12. The universal joint according to claim 11 wherein said resilient seal includes a first side facing said cup and a second side facing said at least one trunnion and wherein said resilient seal includes a first protruding portion extending from said first side said first seal portion to directly engage said inner surface of said cup, a second protruding portion extending from said second side said first seal portion to directly engage said outer surface of said at least one trunnion, a third protruding portion extending from said second side at said third seal portion to directly engage said outer surface of said at least one trunnion, a fourth protruding portion extending from said first side at said second seal portion to directly engage said distal edge surface of said cup, and a fifth protruding portion extending from said second side said second seal portion to directly engage said outer surface of said at least one trunnion.

13. The universal joint according to claim 11 including an insert attached to said resilient seal and positioned directly between said second seal portion and said deflector.

14. A universal joint comprising:
a central body having at least one trunnion that defines an axis extending along a length of said at least one trunnion;
a cup rotatably supported on said at least one trunnion;
a seal assembly providing a sealed interface between said at least one trunnion and said cup wherein said seal assembly includes a resilient seal engaging an inner surface of said cup and an outer surface of said at least one trunnion, and a deflector that provides an attachment interface between said cup and said at least one trunnion to substantially enclose said resilient seal within a cavity formed between said at least one trunnion and said cup, and wherein said resilient seal includes a first seal portion extending generally parallel to said axis and into a first gap formed between said inner surface of said cup and said outer surface of said at least one trunnion, a second seal portion extending transverse to said axis and into a second gap formed between a distal edge surface of said cup and said outer surface of said at least one trunnion, and a third seal portion transitioning from said first seal portion to said second seal portion wherein said third seal portion is orientated obliquely relative to said first and said second seal portions; and wherein said outer surface of said at least one trunnion comprises a contoured surface having a first surface portion extending generally parallel to said axis, a second surface portion curving away from said first surface portion outwardly in a direction away from said axis, a third surface portion extending from said second surface portion in a direction generally parallel to said axis, a fourth surface portion extending from said third surface portion in an inward direction toward said axis, a fifth surface portion extending from said fourth surface portion in a direction transverse to said axis, and a sixth surface portion extending from said fifth surface portion in a direction parallel to said axis.

15. The universal joint according to claim 14 wherein said first seal portion engages said first surface portion and said second seal portion engages said third surface portion.

16. The universal joint according to claim 15 wherein said deflector engages at least said fourth and said fifth surface portions.

17. The universal joint according to claim 15 wherein said sixth surface portion comprises a non-machined trunnion surface.

18. A universal joint comprising:
a central body having a plurality of trunnions extending radially outwardly from said central body;
a cup rotatably supported on each of said plurality of trunnions;
a needle bearing assembly positioned between an outer surface of each of said plurality of trunnions and a corresponding cup; and
a seal assembly providing a sealed interface between each of said plurality of trunnions and a corresponding cup wherein said seal assembly includes a resilient seal with a first seal portion that engages said outer surface of a corresponding one of said plurality of trunnions and an inner surface of a respective cup, and said resilient seal including a second seal portion that transitions from said first seal portion and extends into a gap formed between a distal edge surface of said respective cup and said outer surface of said corresponding one of said plurality of trunnions, and wherein said seal assembly includes a deflector providing a snap-fit attachment interface between said corresponding one of said plurality of trunnions and said respective cup, and an insert positioned between said resilient seal and said deflector in a direction extending inward toward said corresponding one of said plurality of trunnions, and wherein said insert is positioned directly between an outer surface of said second seal portion and an inner surface of said deflector.

19. The universal joint according to claim 18 wherein said deflector includes a first portion received within a first groove formed in an outer surface of said respective cup and a second portion received within a recess formed within said outer surface of said corresponding one of said plurality of trunnions, said deflector enclosing said resilient seal and said insert within a cavity formed between said corresponding one of said plurality of trunnions and said respective cup.

20. The universal joint according to claim 18 wherein said insert is attached to said resilient seal such that said insert does not contact said cup.

* * * * *

UNITED STATES PATENT AND TRADEMARK OFFICE
CERTIFICATE OF CORRECTION

PATENT NO. : 7,361,093 B2  
APPLICATION NO. : 11/125965  
DATED : April 22, 2008  
INVENTOR(S) : Kurzeja It is certified that error appears in the above-identified patent and that said Letters Patent is hereby corrected as shown below:

Claim 1, Column 5, line 6: "seat" should read as --seal--

Claim 12, Column 6, line 32: insert --at-- after "side" and before the second occurrence of "said"

Claim 12, Column 6, line 34: insert --at-- after "side" and before the second occurrence of "said"

Claim 12, Column 6, line 42: insert --at-- after "side" and before the first occurrence of "said"

Signed and Sealed this

Fifteenth Day of July, 2008

JON W. DUDAS  
*Director of the United States Patent and Trademark Office*